United States Patent
Bright et al.

(10) Patent No.: US 7,542,556 B2
(45) Date of Patent: Jun. 2, 2009

(54) APPARATUS AND METHOD FOR PROVIDING MULTIPLE LINE BILLING IN TELECOMMUNICATIONS SYSTEMS

(75) Inventors: Penny Lynne Bright, Naperville, IL (US); Eric Harold Henrikson, Redmond, WA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1122 days.

(21) Appl. No.: 10/390,463

(22) Filed: Mar. 17, 2003

(65) Prior Publication Data

US 2004/0199464 A1 Oct. 7, 2004

(51) Int. Cl.
*H04M 15/00* (2006.01)
*H04M 11/00* (2006.01)
*H04L 12/66* (2006.01)

(52) U.S. Cl. ............. 379/114.01; 379/121.03; 379/127.05; 455/406; 370/352

(58) Field of Classification Search ............ 379/114.01, 379/114.28, 121.03, 127.03, 127.05, 114.03; 455/405–408; 370/259, 493, 494, 495, 352
See application file for complete search history.

(56) References Cited

U.S. PATENT DOCUMENTS

| | | | |
|---|---|---|---|
| 5,819,176 A | 10/1998 | Rast | |
| 5,835,856 A | 11/1998 | Patel | |
| 5,915,006 A * | 6/1999 | Jagadish et al. | 379/115.01 |
| 6,618,587 B1 * | 9/2003 | Ghafoor | 455/419 |
| 7,017,050 B2 * | 3/2006 | Dalton et al. | 726/5 |
| 2002/0090927 A1 * | 7/2002 | Allande et al. | 455/408 |
| 2005/0071679 A1 * | 3/2005 | Kiss et al. | 713/201 |
| 2005/0136888 A1 * | 6/2005 | Koskinen et al. | 455/406 |

FOREIGN PATENT DOCUMENTS

| | | |
|---|---|---|
| EP | 1 221 807 | 7/2002 |
| WO | WO 9219078 | 10/1992 |
| WO | WO 9960770 | 11/1999 |
| WO | WO 0105128 | 1/2001 |

* cited by examiner

Primary Examiner—Quoc D Tran (57) ABSTRACT

One or more application server components serve to associate one or more digit strings with one or more numbers available to one party of one or more parties to a call and to impose one or more charges on the one or more numbers available to the one party to the call. Where the one party to the call employs an equipment that fails to support a P-Asserted-Identity header of the call, one application server component of the one or more application server components serves to: remove from the header of the call one digit string of the one or more digit strings available to the one party; insert into the P-Asserted-Identity header one number of the one or more numbers available to the one party associated with the one digit string; and to impose one charge of the one or more charges on the one number associated with the one digit string.

23 Claims, 7 Drawing Sheets

APPARATUS AND METHOD FOR PROVIDING MULTIPLE LINE BILLING IN TELECOMMUNICATIONS SYSTEMS

TECHNICAL FIELD

The invention relates generally to telecommunications systems and more particularly to multiple line billing for parties of the telecommunications systems.

BACKGROUND

With the worldwide acceptance of wireless telecommunications devices, parties often carry more than one device. They might have one device for work affairs and another device for personal affairs. One way to reduce the number of devices one carries is to provision one or more numbers, for example, one or more calling or called party numbers, for a single device, for example, one number for work affairs, and one number for personal affairs. The one or more numbers comprise one or more E.164 numbers (e.g. phone number 1-888-555-1000) or one or more Session Initiation Protocol ("SIP") Universal Resource Identifiers ("URIs") (e.g. a web address www.yoursite.com). To provide billing for the one or more numbers for calls used for initiation the call or terminating the call, the call must contain information regarding the party of the initiation device and the party of the termination device.

One piece of information required for accurate billing is the called party number. The called party number comprises the number of a device to which a call is directed. The technology of the device currently supports the called party number field when initiating or terminating the call. The network employs the called party number to route the call to the termination device. The called party number serves as the billing number of the termination device. Another piece of information required for accurate billing is the calling party number. The calling party number comprises the number of a device which initiated a call.

One way to indicate the calling party number of the initiation device is for the technology of the device to support the P-Asserted-Identity header. The P-Asserted-Identity header is one of the Third Generation Partnership Project ("3GPP") defined headers used to convey the calling party number of the initiation device to the termination device. The calling party number serves as the billing number of the initiation device.

Without a standard signaling protocol established between the network and the devices, the network provider is forced to either support both signaling protocols at great cost, or support one signaling protocol at risk of customer resentment.

Thus there is a need to support multiple line billing in the Universal Mobile Telecommunications Systems ("UMTS") or Global System for Mobile communication ("GSM") systems where one or more signaling protocols are available for the devices requiring minimal impact to the network.

SUMMARY

An apparatus and method for imposing one or more charges on one or more numbers associated with respective one or more parties to a call. Where one party of the one or more parties to the call employ an equipment that fails to support a P-Asserted-Identity header of the call, the one party employs one digit string of one or more digit strings to select one number of the one or more numbers associated with the one party to impose one charge of the one or more charges for the call. One application server component of one or more application server components serves to associate the one digit string with the one number of the one or more numbers associated with the one party and impose the one charge on the one number associated with the one digit string. The one application server component serves to support the P-Asserted-Identity header by removing the one digit string and inserting the one number associated with the one digit string into the P-Asserted-Identity header of the call.

DESCRIPTION OF THE DRAWINGS

Features of exemplary implementations of the invention will become apparent from the description, the claims, and the accompanying drawings in which:

DETAILED DESCRIPTION

Figure 1:
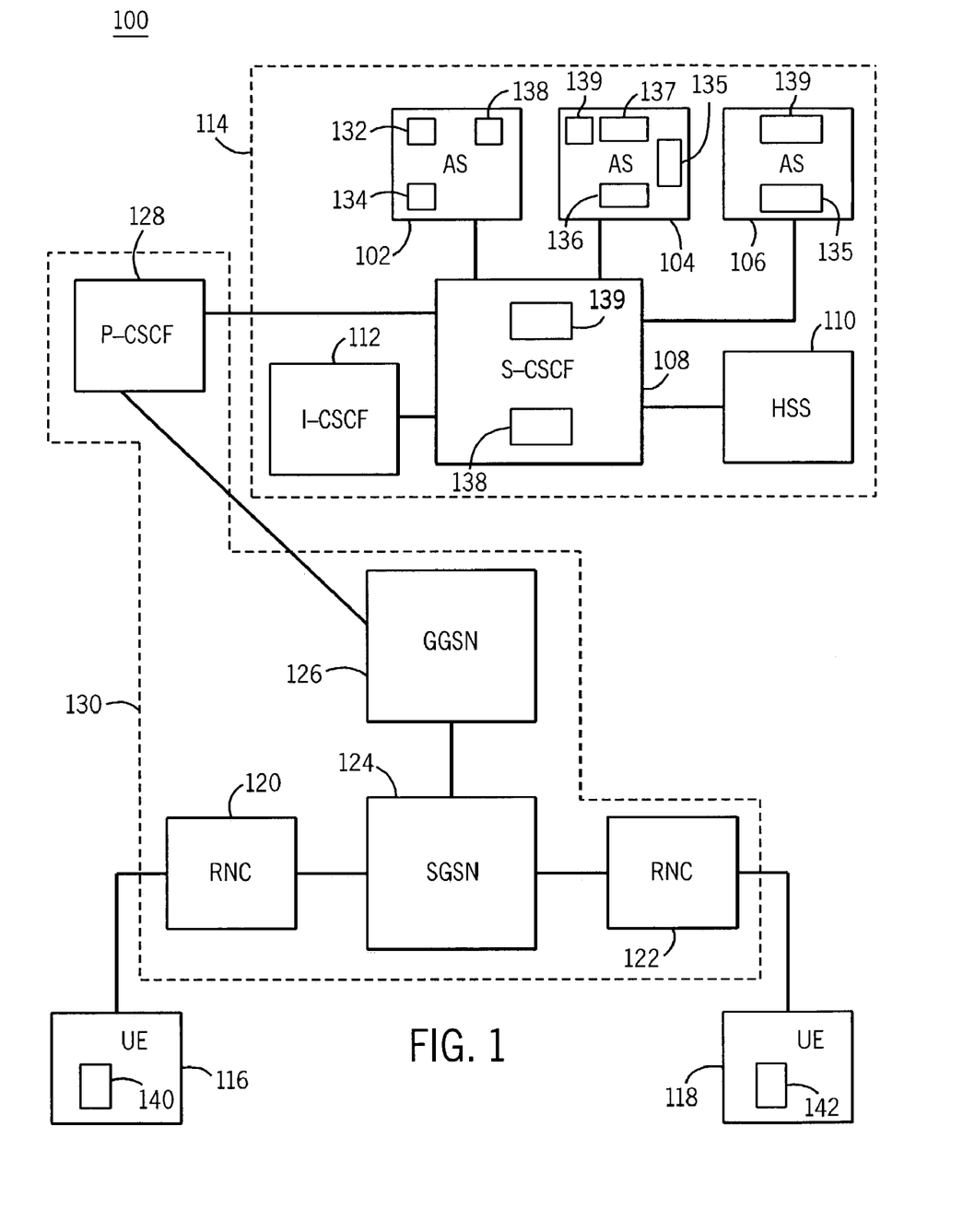
FIG. 1 is a representation of one exemplary implementation of an apparatus that comprises a plurality of application server components, a function server component, a storage server component, a first equipment, a second equipment, and a plurality of network components.

Turning to FIG. 1, an apparatus 100 in one example comprises a plurality of components such as computer software and/or hardware components. A number of such components can be combined or divided in the apparatus 100.

Referring to FIG. 1, the apparatus 100 in one example comprises application server components 102, 104, and 106, a function server component 108, a storage server component 110, a network component 112, a network 114, equipment 116 and 118, network components 120, 122, 124, 126, and 128, and a network 130.

In one example the application server components 102, 104, and/or 106 comprise software components resident in the function server component 108. In another example the application server components 102, 104, and/or 106 comprise hardware components external to the function server component 108. The function server component 108 in one example comprises a Serving Call Session Control Function ("S-CSCF") server. The storage server component 110 in one example comprises a Home Subscriber Server ("HSS") component. The network component 112 in one example comprises an Interrogating Call Session Control Function ("I-CSCF"). The network 114 in one example comprises the application server components 102, 104, and/or 106, the function server component 108, the storage server component 110, and the network component 112.

The equipment 116 and/or 118 in one example comprise a cellular phone. The equipment 116 and/or 118 in another example comprises a personal computer. The network components 120 and 122 in one example comprise Radio Network Controllers ("RNCs"). The network component 124 in one example comprises a Serving General Packet Radio Service Serving Node ("SGSN"). The network component 126 in one example comprises a Gateway General Packet Radio Service Serving Node ("GGSN"). The network component 128 in one example comprises a Proxy Call Session Control Function ("P-CSCF") server. The network 130 in one example comprises network components 120, 122, 124, 126, and 128.

The application server component 102 in one example imposes one charge of one or more charges on one number of a plurality of numbers associated with a party of the equipment 116 for a call. The application server component 102 in one example comprises an initiation repository data component 132, a custom-initiation repository data component 134, and/or a toggle component 138. The application server component 102 utilizes a signaling protocol, for example, a Session Initiation Protocol ("SIP") signaling protocol. The application server component 102 in one example serves to support a P-Asserted-Identity header extension of the Session Initiation Protocol of the call. The application server component 102 in one example serves to remove a digit string, for example, an initiation digit string, from a called party number of a header of the call.

The application server component 104 in one example imposes one charge of one or more charges on one number of a plurality of numbers associated with a party, for example, a called party, of the equipment 118 for the call. The application server component 104 in one example comprises a forward-to component 135, a termination repository data component 136, a callback component 137, and/or multiple registration states 139. The application server component 104 in one example provides a forward-to service to the called party of the equipment 118 where the call is directed to one public user identity of a deregistered state of a plurality of public user identities associated with the called party of the equipment 118. The application server component 104 in one example serves to employ the callback component 137 to provide accurate billing for the party of the equipment 118 when calling back the party of the equipment 116. The application server component 104 in one example utilizes the Session Initiation Protocol signaling protocol. The application server component 104 in one example serves to support the P-Asserted-Identity header extension of the Session Initiation Protocol of the call. In another example, the application server component 104 serves to prepend a digit string, for example, a termination digit string, to a calling party number of the call.

The application server component 106 in one example serves to impose one charge of one or more charges on one number of a plurality of numbers associated with the party of the equipment 118 for a forward-to call. The application server component 106 in one example comprises the forward-to component 135 and the multiple registration states 139.

The application server component 106 in one example serves to provide the forward-to service for the called party, for example, the party of the equipment 118. The application server component 106 utilizes the signaling protocol, for example, the Session Initiation Protocol signaling protocol.

The function server component 108 assists the application server components 102, 104, and/or 106, to provide multiple line billing for the call received over the networks 114 and 130. The function server component 108 in one example comprises the toggle component 138 and the multiple registration states 139. The function server component 108 in one example adheres to the Session Initiation Protocol signaling protocol. The function server component 108 in one example adheres to a signaling protocol, for example, a DIAMETER signaling protocol, to communicate with the storage server component 110. In one example, the function server component 108 serves to route the call to one or more application server components 102, 104, and/or 106, of the one or more application server components 102, 104, and 106. The function server component 108 in combination with the application server components 102, 104, and/or 106 supports the P-Asserted-Identity header extension to the Session Initiation Protocol of the call.

The storage server component 110 stores multiple profiles of one or more parties, for example, the party of the equipment 116 and the party of the equipment 118. The storage server component 110 in one example comprises the initiation repository data component 132, the custom-initiation repository data component 134, the termination repository data component 136, and information regarding a termination service of the party of the equipment 116. The storage server component 110 receives one or more REGISTER messages (e.g. one REGISTER message comprising a timer field set to a value greater than zero or an INVITE message comprising a toggle string) and one or more DEREGISTER messages (e.g. one REGISTER message comprising the timer field set to the value of zero or the INVITE message comprising the toggle string) from the function server component 108. The storage server component 110 communicates with the application server components 102, 104 and/or 106, and the function server component 108 to download the multiple profiles of the one or more parties, for example, the party of the equipment 116 and the party of the equipment 118. The storage server component 110 communicates via the DIAMETER signaling protocol.

The network component 112 in one example serves to provide an access point into the network 114 for the INVITE messages coming from a second network 114. The network component 112 in one example serves to provide the access point into the network 114 for the one or more REGISTER messages.

The network 114 in one example serves to provide multiple line billing for one or more equipments, for example, the equipments 116 and 118, by communicating with one or more of the application server components 102, 104, and 106. In one example, the network 114 adheres to the Session Initiation Protocol signaling protocol. In another example, the network 114 adheres to the DIAMETER signaling protocol for communication with the storage server component 110.

The equipments 116 and/or 118 serve to register one or more public user identities of the plurality of public user identities associated with a party, for example, the party of the equipment 116, initiate the call, and receive the call. The equipment 116 and/or 118 in one example comprise respective radio transmitters and respective Subscriber Identification Modules ("SIMs") 140 and 142. The Subscriber Identification Module 140 of the equipment 116 in one example comprises one number or Universal Resource Identifier of the party of the Subscriber Identification Module. The equipment 116 in one example initiates the call to the network 130. The equipment 118 in one example receives the call from the network 130. The equipment 116 and 118 communicate with the network 130 by adhering to the Session Initiation Protocol ("SIP") signaling protocol.

The network component 120 serves to route the call between the equipment 116 and the network component 122. The network component 124 serves to route the call between the network component 124, and the network components 120 and 122. The network component 126 serves to route the call between the network component 128 and the network component 124. The network component 128 serves to route the call between the network component 108 of the network 114 and the network component 126.

The network 130 in one example routes the call from the equipment 116 to the equipment 118. In one example, the network 130 comprises a first visiting network 130 for the equipment 116. In another example, the network 130 comprises a second visiting network 130 for the equipment 118. In one example, the first visiting network 130 comprises the second visiting network 130. In another example, the first visiting network 130 is distinct from the second visiting network 130. The network 130 adheres to the Session Initiation Protocol signaling protocol.

The application server component 102 communicates with the storage server component 110 to download relevant portions of one profile associated with the party of the equipment 116 of the multiple profiles, for example, a copy of a repository data component such as a copy of the initiation repository data component 132, upon receipt of the REGISTER message from the function server component 108. In another example, the copy of the initiation repository data component is stored in a component (not shown) coupled with the application server component 102. The copy of the initiation repository data component 132 in one example stores the multiple public user identities associated with a calling party, for example, the party of the equipment 116, and respective multiple digit strings, for example, multiple initiation digit strings. The multiple public user identities of the initiation repository data component 132 comprise respective multiple calling party numbers available to the calling party. The calling party of the equipment 116 in one example employs the one initiation digit string of the multiple initiation digit strings to indicate a selection of the one number from the any of multiple numbers available to the calling party of the equipment 116 to the call.

Upon receipt of the call from the function server component 108, where the called party number of the call is prepended with the one initiation digit string of the multiple initiation digit strings available to the calling party, for example, the party of the equipment 116, the application server component 102 in one example employs the one initiation digit string to relate the one initiation digit string with one public user identity of the multiple public user identities of the party of the equipment 116 and to impose the one charge on the calling party number related to the one public user identity. The application server component 102 in one example: removes the one initiation digit string from the called party number; employs the one initiation digit string to obtain the calling party number from the initiation repository data component 132; and inserts the calling party number of the one public user identity associated with the one initiation digit string in a calling-party-number field of the header, for example, a P-Asserted-Identity header, of the call. The application server component 102 returns the call to the function server component 108.

In another example, the application server component 102 communicates with the storage server component 110 to download a copy of the custom-initiation repository data component 134. The copy of the custom-initiation repository data component 134 in one example serves to store a copy of the multiple public user identities associated with the calling party of the equipment 116 and respective multiple called party numbers. The multiple public user identities comprise respective calling party numbers available to the calling party. The calling party, for example, the party of the equipment 116, in one example employs the custom-initiation repository data component 134 to relate the one or more called party numbers to respective calling party numbers of the respective public user identities. In one example, the application server component 102 serves to transfer the custom-initiation repository data component 134 to the equipment 116.

Upon receipt of the call comprising the called party number, the application server component 102 in one example employs the called party number of the called-party-number field of the header of the call to obtain the calling party number from the custom-initiation repository data component 134. The application server component 102 in one example imposes the one charge on the calling party number that is related to the called party number of the call. The application server component 102 inserts the calling party number into the calling-party-number field of the P-Asserted-Identity header of the call.

Upon receipt of the one REGISTER message from the function server component 108, the application server component 104 communicates with the storage server component 110 to download the relevant portions of the profile of the user, for example, a copy of the repository data structure such as a copy of the termination repository data component 136. The copy of the termination repository data component 136 in one example serves to store a copy of the multiple public user identities associated with the called party, for example, the party of the equipment 118, and respective multiple digit strings, for example, multiple termination digit strings. The multiple public user identities of the termination repository data component 136 comprise respective multiple called party numbers available to the called party.

In one example, upon receipt of the call destined for the called party, for example, the party of the equipment 118, the application server component 104 in one example employs the one called party number of the call to obtain the one termination digit string of the multiple termination digit strings associated with one public user identity of the multiple public user identities of the called party of the equipment 118. The application server component 104 serves to prepend the one termination digit string associated with the one public user identity to the calling party number contained in the calling-party-number field of the header of the call. The application server component 104 in one example serves to impose the one charge on the one called party number of the called-party-number field of the header of the call.

The forward-to component 135 of the application server component 104 in one example comprises multiple forward-to enables and multiple forward-to numbers for the one or more parties to the call, respectively. The multiple forward-to numbers comprise respective numbers of the plurality of numbers to which the call is re-directed in the event that a registration state of the one public user identity to which the call is directed comprises the deregistered state. The multiple forward-to enables indicate that the forward-to service is available for the respective called parties, for example, the party of the equipment 118.

Upon receipt of the call destined for the one public user identity associated with the called party, for example, the party of the equipment 118, that comprises the registration state of the deregistered state, the application server component 104 employs the forward-to component 135 to initiate a second call into the networks 114 and 130. The second call into the networks 114 and 130 in one example comprises a second called party number that comprises one forward-to number of the multiple forward-to numbers.

The application server component 104 in one example employs the called party number of the call to obtain one forward-to enable and the one forward-to number from the forward-to component 135. In one example, the application server component 104 serves to insert the one forward-to number into a redirect-party-number field of the header of the second call. In another example, the application server component 104 serves to insert the one forward-to number in the called-party-number field of the header of the second call. The application server component 104 in one example serves to impose the one charge on the one called party number of the called-party-number field of the header of the call destined for the one public user identity that comprises the deregistered state.

In another example, upon receipt of the call the application server component 104 stores information about the call in the callback component 137. In one example, where the party of the equipment 116 initiates the call to the party of the equipment 118, the application server component 104 stores the calling party number contained in the calling-party-number field of the call and the one digit string prepended to the calling party number in the callback component 137. The party of the equipment 118 in one example initiates a callback call to the party of the equipment 116 by selecting the calling party number from which the party of the equipment 116 initiated the call.

In one example, upon receipt of the callback call, the application server component 104 employs the called party number of the callback call to obtain the one digit string from the callback component 137 and to prepend the called party number of the callback call with the one digit string. In another example, the application server component 104 employs the called party number of the callback call to obtain the calling party number from the callback component 137 and to insert the calling party number into the calling-party-number field of the header of the callback call, for example, in the P-Asserted-Identity header of the callback call. The application server component 104 in one example imposes the one charge on the calling party number associated with the called party number of the callback call.

In one example, where the application server component 104 comprises the multiple registration states 139 for the multiple public user identities associated with the party of the equipment 118, the application server component 104 in one example provides the forward-to service for the call initiated by the party of the equipment 116 comprising the called party number associated with the one public user identity of the deregistered state of the called party of the equipment 118.

In one example, where the application server component 106 maintains the multiple registration states 139 for the multiple public user identities associated with the party of the equipment 118, the application server component 106 in one example provides the forward-to service for the call initiated by the party of the equipment 116 comprising the called party number associated with the one public user identity of the deregistered state of the party of the equipment 118.

The function server component 108 communicates with the storage server component 110 to download a copy of the multiple profiles for the one or more parties to the call on the networks 114 and 130. The multiple profiles in one example comprises respective one or more filter criterions. The function server component 108 in one example employs one or more of the one or more filter criteria associated with one profile of one party of the one or more parties to the call on the networks 114 and 130 to route the calls received to one or more of the application server components 102, 104, and/or 106.

Upon receipt of the call, the function server component 108 serves to route the call based on one or more of the one or more filter criteria of the one profile associated with the party of the equipment 116. The one or more filter criteria in one example indicate that where the called party number of the call is prepended with the one initiation digit string, the function server component 108 routes the call to the application server component 102. The one or more filter criteria in one example dictate that upon receipt of the call comprising the toggle string the function server component 108 serves to route the call to the application server component 104. In one example, the one or more filter criteria indicate that where the called party number of the call matches the one public user identity of the multiple public user identities of the party of the equipment 118, the function server component 108 serves to route the call to the application server component 104. Upon receipt of the call in one example where the called party number matches the one public user identity that comprises the deregistered state for the party of the equipment 118, the function server component 108 in one example forwards the call to the application sever component 106.

The one or more profiles of the one or more respective parties to the call comprise one or more public user identities. The multiple public user identities of the respective one or more parties comprises the plurality of numbers to which the call is billed, respectively. In one example, the multiple public user identities comprise one or more calling party numbers for the party of the equipment 116 initiating the call. In another example, the multiple public user identities comprise one or more called party numbers for the party of the equipment 118 receiving the call. The plurality of numbers in one example comprise an E.164 number, for example, (e.g. 1-800-555-1000) or a Session Initiation Protocol Universal Resource Identifier, for example, an email address (e.g. youremail@address.com).

The function server component 108 in one example maintains the multiple registration states 139 for the multiple public user identities, respectively, associated with the party of the equipment 116. The multiple registration states 139 comprise either respective registered states or respective deregistered states. The function server component 108 in one example employs one registration state of the multiple registration states 139 of one public user identity of the multiple public user identities associated with the one digit string of the call to route the call to one or more of the application server components 102, 104, and/or 106.

Upon receipt of the REGISTER message from the party of the equipment 116, the function server component 108 communicates with the storage server component 110 to download the relevant information from the profile of the party of the equipment 116. In one example, the function server component 108 forwards the REGISTER message to the application server components 102, 104, and/or 106, and the storage server component 110 based on the filter criteria of the one profile of the party of the equipment 116. In another example where the equipment 116 and the network component 112 have been pre-provisioned to receive the REGISTER message, the function server component 108 serves to notify the equipment 116 and the network component 112 of the change in the one registration state of the one public user identity associated with the REGISTER message of the party of the equipment 116.

The function server component 108 in one example comprises the toggle component 138. The toggle component 138 in one example comprises one or more toggle enables associated with the one or more parties of the call. The one or more toggle enables allow the toggle component 138 to ensure that at least one public user identity of the multiple public user identities associated with the party of the equipment 116 comprises the registered state.

Upon receipt of the DEREGISTER message from the party of the equipment 116, the function server component 108 serves to relate the DEREGISTER message to one public user identity of the one or more public user identities associated with the party of the equipment 116 and change from the registered state to the deregistered state the one registration state associated with the one public user identity related to the DEREGISTER message. The function server component 108 in one example serves to forward the DEREGISTER message to one or more of the application server components 102, 104, and/or 106. The function server component 108 in one example serves to notify the storage server component 110 of the change in the one registration state of the one public user identity associated with the DEREGISTER message.

Where the DEREGISTER message comprises the toggle string *72 in one example the function server component 108 employs the toggle component 138 to initiate one or more REGISTER messages to one or more of the one or more application server components 102, 104, and/or 106. The function server component 108 in combination with the toggle component 138 employs the toggle string to relate the toggle string to the one public user identity associated with the party of the equipment 116 and serves to change from the registered state to the deregistered state the one registration state of the one public user identity. Where the toggle enable is enabled for the profile of the party of the equipment 116, the function server component 108 in combination with the toggle component 138 serves to change to respective registered states respective registration states of the respective multiple public user identities associated with the DEREGISTER message except the one public user identity associated with the toggle string. The function server component 108 serves to notify the storage server component 110 of the one or more changes in the one registration state and the respective registration states of the multiple public user identities.

In another example, the application server component 102 comprises the toggle component 138. Upon receipt of the DEREGISTER message, for example, either the toggle string *72 or the REGISTER message comprising the timer set to zero, the function server component 108 in one example serves to forward the DEREGISTER message to the application server component 102 based on the filter criteria for the party of the equipment 116. The application server component 102 upon receipt of the DEREGISTER message employs the toggle component 138. Where the toggle enable is enabled in the one profile of the party of the equipment 116, the application server component 102 in combination with the toggle component 138 initiates a second DEREGISTER message for the one public user identity associated with the one digit string *2* (e.g. the REGISTER message comprising the timer set to the value of zero) and one or more REGISTER messages to the function server component 108 for the one or more public user identities associated with the party of the equipment 116 except the public user identity associated with the one digit string *2*.

Upon receipt of the second DEREGISTER message initiated by the application server component 102, the function server component 108 serves to change to the deregistered state the one registration state of the one public user identity associated with the digit string *2*. Upon receipt of the one or more REGISTER messages initiated by the application server component 102, the function server component 108 serves to change to respective registered states the one or more public user identities of the multiple public user identities associated with the party of the equipment 116 except the one public user identity associated with the digit string *2*. The function server component 108 serves to forward the second DEREGISTER message and the one or more REGISTER messages to the application server components 104 and/or 106 based on the filter criteria stored in the function server component 108. The function server component 108 serves to notify the storage server component 110 of the one or more changes in the one or more registration states of the one or more public user identities.

Upon receipt of the REGISTER message from the function server component 108, the storage server component 110 in one example performs permission checking on the party of the equipment 116. For example, the storage server component 110 determines if the party of the REGISTER message is currently registered on the networks 114 and 130 and if the party of the REGISTER message is allowed to register on the networks 114 and 130.

Where the party of the equipment 116 initiates the REGISTER message and is not currently registered on the networks 114 and 130, the storage server component 110 in one example returns an acknowledge call to the function server component 108 along with the one profile of the party, for example the party of the equipment 116. The REGISTER message in one example serves to implicitly change the registration states of all public user identities associated with the party of the equipment 116 to the registered state.

The equipments 116 and 118 in one example serves to register one or more public user identities by sending the one or more REGISTER messages to the networks 114 and 130. The equipments 116 and 118 in one example serve to deregister one or more public user identities by sending one or more DEREGISTER messages to the networks 114 and 130. The REGISTER messages to the networks 114 and 130 in one example comprises a Temporary Internet Protocol Multimedia Subsystem Public Identity ("TIMPU"), which indicates the one or more public user identities of the party of the equipment 116 to register on the networks 114 and 130.

Where the calling party, for example, the party of the equipment 116, desires to establish the call with the party of the equipment 118, the party of the equipment 116 initiates the call to the equipment 118 via the networks 114 and 130. The party of the equipment 116 in one example serves to select the calling party number on which to impose the one charge for the call by prepending the called party number with the one initiation digit string.

Where the called party, for example, the party of the equipment 118, receives the call, the equipment 118 in one example displays the calling party number with the one termination digit string prepended to the calling party number. The one termination digit string prepended to the calling party number displayed on the equipment 118 in one example indicates the called party number onto which was imposed the one charge for the call.

The equipment 118 in one example serves to provide a first distinctive ring tone for the call that matches a first called party number. The equipment 118 in another example serves to provide a second distinctive ring tone for the call that matches a second called party number.

The equipment 116 and/or 118 in one example comprise the custom-initiation repository data component 134. The equipment 116 and/or 118 in one example serve to communicate with the application server component 102 to download the copy of the custom-initiation repository data component 134. In another example, the equipment 116 employ a Short Message System (SMS) method to download the copy of the custom-initiation repository data component 134 from the storage server component 110. In a further example, the equipment 116 employs a website from which to download the copy of the custom-initiation repository data component 134.

In another example, the equipment 118 comprises the callback component 137. The party of the equipment 118 in one example serves to initiate the callback call to the party of the equipment 116. The equipment 118 in one example employs the called party number of the call to obtain the digit string from the callback component 137 and to prepend the called party number of the callback call with the digit string.

Figure 2:
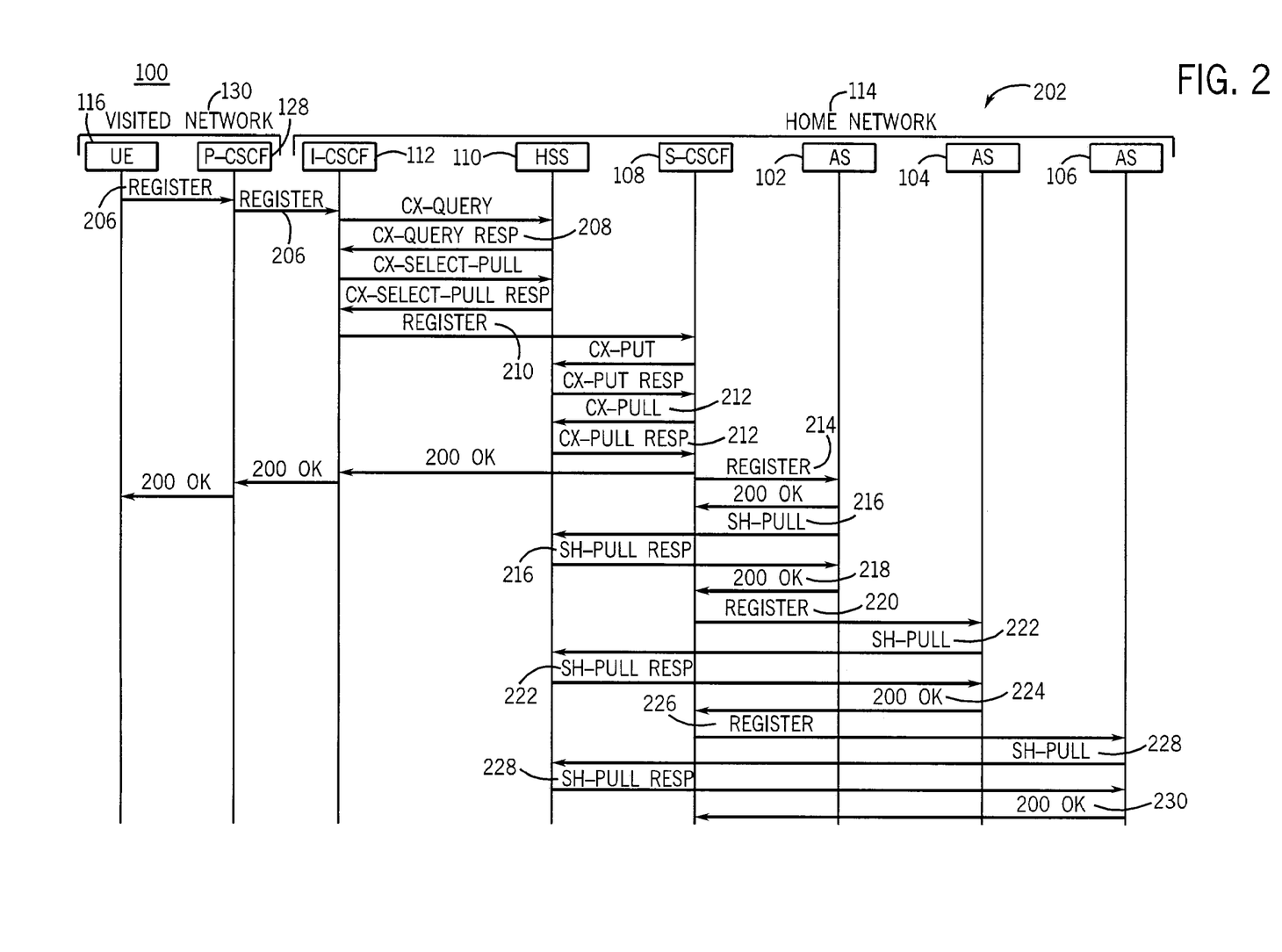
FIG. 2 is an exemplary functional flow of a registration of the first equipment of the apparatus of FIG. 1.

Turning to FIG. 2, trace 202 illustrates the one REGISTER message of the party of the equipment 116 on the network 114. The trace 202 comprises the equipment 116, the network 114 and 130, the network component 112, 120, 124, the function server component 108, the application server components 102, 104, and 106, and the storage server component 110. Trace 202 comprises the STEPS 206, 208, 210, 212, 213, 214, 215, 216, 218, 220, 222, 224, 226, 228, and 230.

The equipment 116 initiates the one REGISTER message in the STEP 206 that is routed through the network 130 to the network 114. The network component 112 communicates with the storage server component 110 in the STEP 208. The storage server component 110 performs the permission checking on the party of the equipment 116. Upon receipt of approval to register from the storage server component 110, the network component 112 forwards the REGISTER message to the function server component 108 in the STEP 210. In the STEP 212, the function server component 108 serves to download from the storage server component 110 the relevant information from the one profile of the party of the equipment 116. In STEP 213, the network component 112 subscribes with the function server component 108 to receive notification regarding the change in registration states of the multiple public user identities associated with the party of the equipment 116. The function server component 108 in one example forwards the one REGISTER message to the application server component 102 in the STEP 214. The function server component 108 in one example forwards the one REGISTER message to the network component 112.

In STEP 216, the application server component 102 communicates with the storage server component 110 to download the copy of the initiation repository data component 132. The application server component 102 returns an acknowledge to the function server component 108 in the STEP 218. The function server component 108 in one example forwards the one REGISTER message to the application server component 104 in the STEP 220.

The STEPS 220-224 function the same as the STEPS 214-218 for the application server component 104. Upon receipt of an acknowledge from the application server component 104 in the STEP 224, the function server component 108 forwards the one REGISTER message to the application server component 106. The STEPS 226-230 function the same as the STEPS 214-218 for the application server component 106. Upon receipt of an acknowledge from the application server component 106, the party of the equipment 116 is registered on the networks 114 and 130.

Referring to FIG. 2, the one DEREGISTER message occurs in an analogous fashion, where the function server component 108 forwards the DEREGISTER message to the application server components 102, 104, and 106, and also notifies the storage server component 110.

Figure 3:
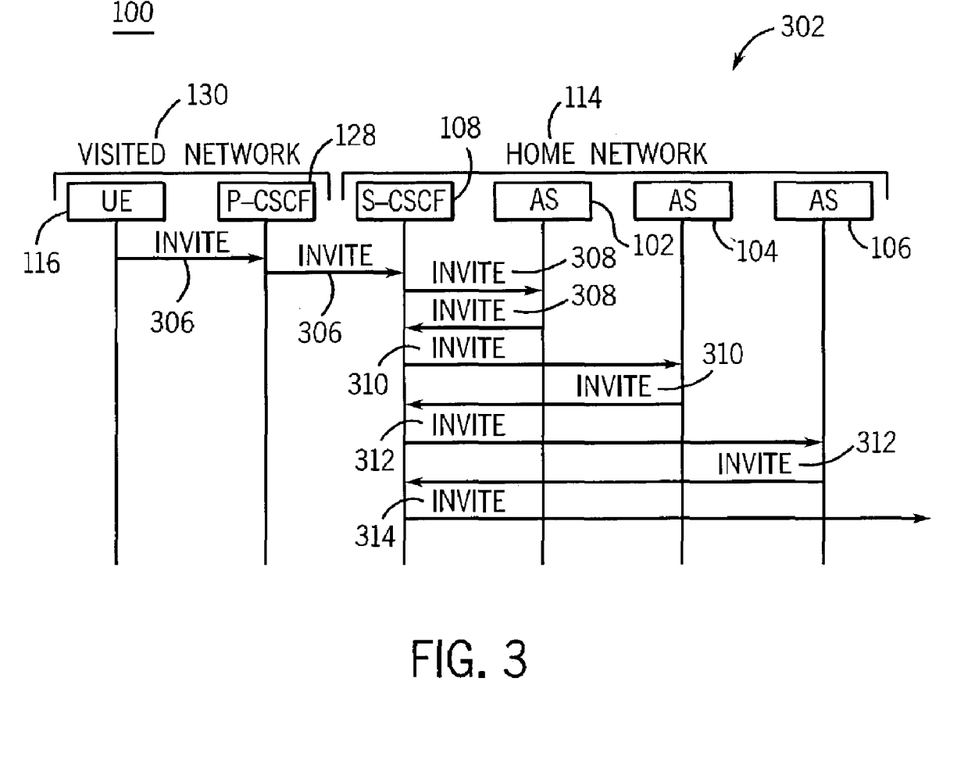
FIG. 3 is an exemplary functional flow of an initiation of a call by the first equipment of the apparatus of FIG. 1.

Turning to FIG. 3, trace 302 illustrates an initiation segment of the call from the party of the equipment 116. The trace 302 comprises the equipment 116, the network 114 and 130, the network equipment 116, the function server component 108, the application server components 102, 104, and 106, and the storage server component 110. Trace 302 comprises the STEPS 306, 308, 310, 312, and 314.

The party of the equipment 116 initiates the call to the network 130 in the STEP 306 where the call is routed from the network 130 to the network 114. In one example, the function server component 108 serves to route the call to the application server component 102 based on the filter criteria associated with the call in the STEP 308. The application server component 102 in one example serves to: place the calling party number associated with the initiation digit string prepended to the called party number in the P-Asserted-Identity header; impose the one charge; and return the call to the function server component 108 in the STEP 308.

Upon receipt of the call from the application server component 102, the function server component 108 in one example serves to route the call to the application server component 104 as in the STEP 310. The application server component 104 serves to perform other initiation services before returning the call to the function server component 108 as shown in the STEP 310.

The STEP 312 for the application server component 106 functions the same as the STEP 310 for the application server component 102. Upon receipt of the call from the application server component 106, the function server component 108 in one example serves to forward the call to the network 114.

Figure 4:
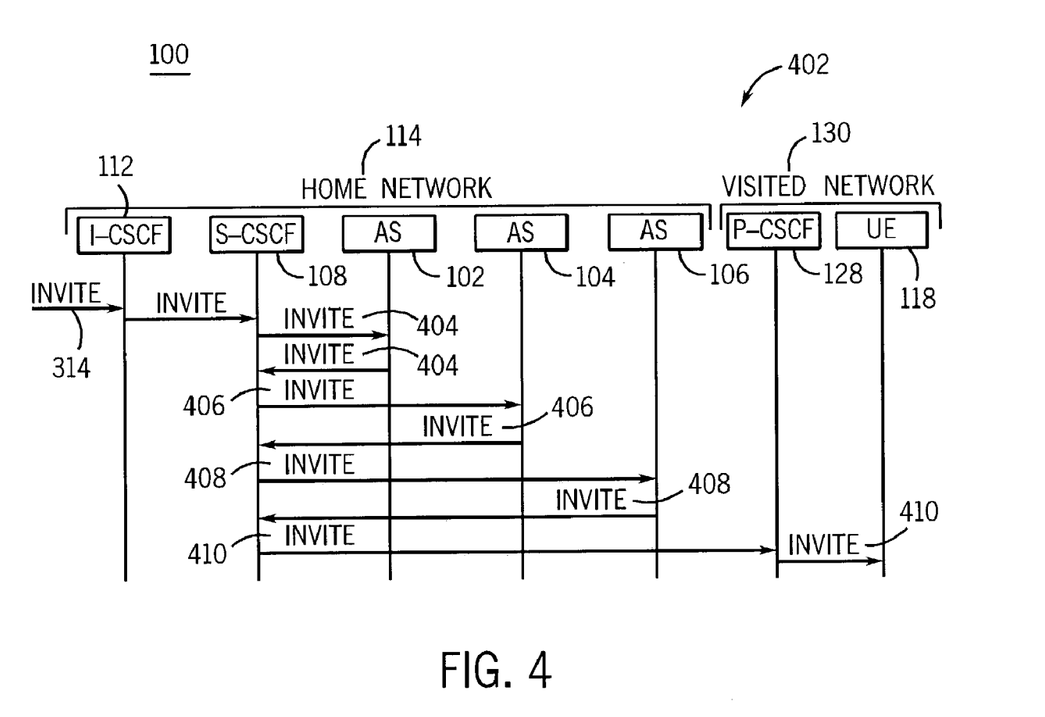
FIG. 4 is an exemplary function flow of a termination of the call to the second equipment of the apparatus of FIG. 1.

Turning to FIG. 4, trace 402 illustrates the receipt of a termination segment of the call in one example by the party of the equipment 118. The trace 402 comprises the equipment 118, the network 114 and 130, the network component 116, the function server component 108, the network component 112, and the application server components 102, 104, and 106. Trace 402 comprises the STEPS 314, 404, 406, 408, and 410.

The network 114 receives the call in the STEP 314 from the party of the equipment 116 and routes the call to the function server component 108. The function server component 108 serves to route the termination segment of the call to the application server component 102 in the STEP 404 based on the filter criteria associated with the party of the called party number of the call, for example, the party of the equipment 118. After the application server component 102 performs any termination services, the application server component 102 returns the call to the function server component 108. The function server component 108 serves to route the call to the application server component 104 which employs the called party number of the call to: impose the one charge on the called party number; prepend the calling party number of the call with the one termination digit string associated with the called party number; and return the call to the function server component 104, as illustrated in the STEP 406. The STEP 408 functions the same as the STEP 404. Upon receipt of the call from the application server component 106 in one example, the function server component 108 in the STEP 410 serves to route the call to the network 130. The network 130 serves to route the call to the party of the equipment 118.

Figure 5:
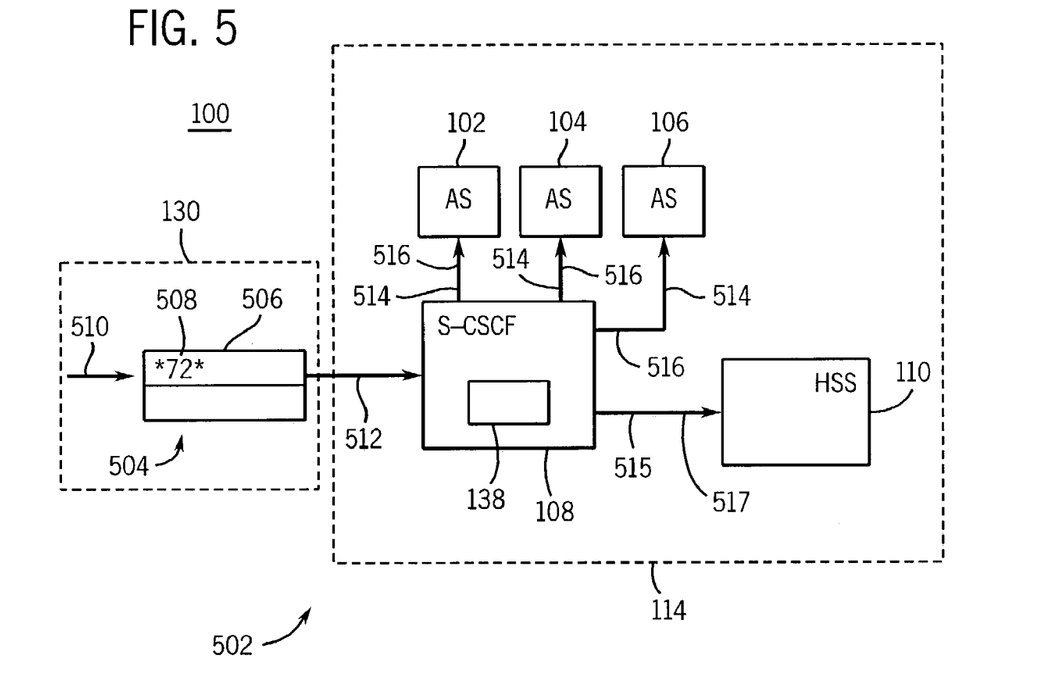
FIG. 5 is an exemplary, expanded functional flow of the registration of the first equipment of the apparatus of FIG. 1.

Turning to FIG. 5, trace 502 illustrates the one DEREGISTER message from the party of the equipment 116 for the one public user identity associated with the toggle string *72. The trace 502 comprises the application server components 102, 104, and 106, the function server component 108, the storage server component 110, the networks 114 and 130, and an exemplary call header 504. The function server component 108 comprises the toggle component 138. The exemplary call header 504 comprises a called-party-number field 506 that comprises a toggle string 508. Trace 502 comprises the STEPS 510, 512, 514, 515, 516, and 517.

The party of the equipment 116 initiates the DEREGISTER message for the public user identity, as illustrated in the STEP 510. The called-party-number field 506 of the exemplary call header 504 comprises the toggle string 508 *72. The exemplary call header 504 routed via the network 130 to the network 114 and arrives at the function server component 108, as illustrated in the STEP 512. The function server component 108 initiates the one or more DEREGISTER messages to the application server components 102, 104, and 106, as shown in the STEP 514. The function server component 108 notifies to the storage server component 110, as shown in the STEP 515, of the one or more changes in the one or more registration states due to the one or more DEREGISTER messages. Where the profile of the party of the equipment 116 comprises the enabled toggle enable, the function server component 108 employs the toggle component 138 to initiate the one or more REGISTER messages to the application server components 102, 104, and 106 for the multiple public user identities associated with the party of the equipment 116 except the public user identity associated with the toggle string *72, as illustrated in the STEP 516. The function server component 108 notifies the storage server component 110, as shown in the STEP 517, of the one or more changes in the one or more registration states due to the one or more REGISTER messages.

Figure 6:
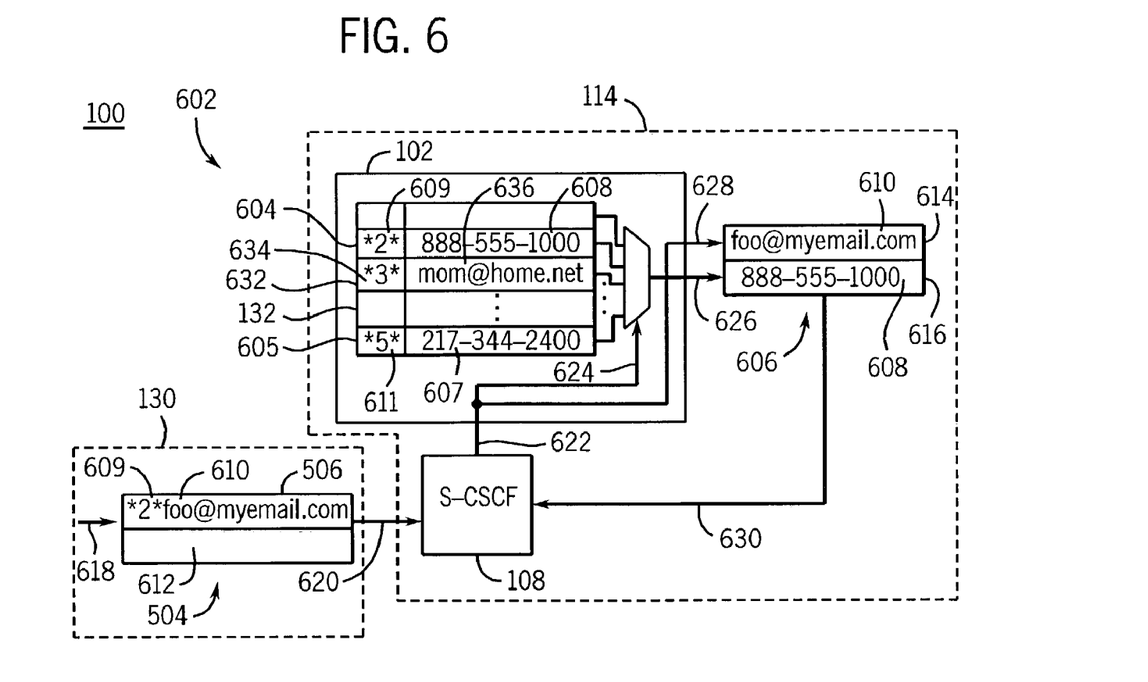
FIG. 6 is an exemplary, expanded functional flow of the initiation of the call by the first equipment, focusing on the call between the first equipment and one application server component of the plurality of application server components of the apparatus of FIG. 1.

Turning to FIG. 6, trace 602 illustrates a call from the calling party of the equipment 116 to the called party of the equipment 118. The trace 602 comprises the application server component 102, the function server component 108, the networks 114 and 130, the initiation repository data component 132, an exemplary call header 502, and an exemplary call header 606. The initiation repository data component 132 comprises public user identities 604, 605, and 632 and respective initiation digit strings 609, 611, and 634. The public user identity 604 comprises the calling party number 608. The public user identity 605 comprises the calling party number 607. The public user identity 632 comprises the calling party number 636. The exemplary call header 502 comprises the called-party-number field 506 and the calling-party-number field 508. The called-party-number field 506 comprises the initiation digit string 609 prepended to the called party number 610. The exemplary call header 606 comprises a called-party-number field 614, and a calling-party-number field 616. The called-party-number field 614 comprises the called party number 610. The calling-party-number field 616 comprises the calling party number 608. Trace 602 comprises the STEPS 618, 620, 622, 624, 626, 628, and 630.

The calling party of the equipment 116 initiates a call to the called party of the equipment 118, in the STEP 618. The call is routed through the network 130 to the network 114 where the call is delivered to the function server component 108, as shown in the STEP 620. The function server component 108 routes the call to the application server component 102, as shown in the STEP 622, based on the filter criteria associated with the exemplary call header 502. The application server component 102 employs the initiation digit string 609 in the STEP 624 to select the one public user identity 604 of the initiation repository data component 132. The application server component 102 inserts the calling party number 608 (e.g. 888-555-1000) of the public user identity 604 selected by the initiation digit string 609 into the calling-party-number field 616 of the exemplary call header 606, as shown in the STEP 626. The application server component 102 removes the initiation digit string 609 from the called-party-number field 506 of the call header 502, places the called party number 610 (e.g. foo@myemail.com) in the called-party-number field 614 of the call header 606, and serves to impose the one charge on the calling party number 608, as shown in the STEP 628. The application server component 102 routes the call back to the function server component 108 in the STEP 630, where the call is routed to the equipment 118.

Figure 7:
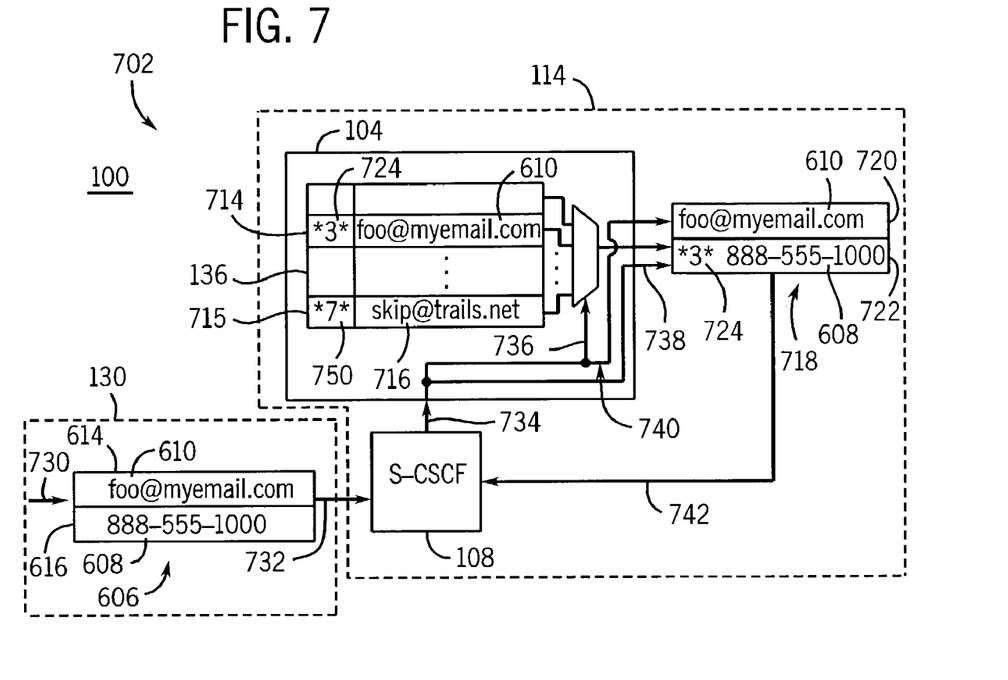
FIG. 7 is an exemplary, expanded functional flow of the termination of the call to the second equipment, focusing on the call between one application server component of the plurality of application server components and the second equipment of the apparatus of FIG. 1.

Turning to FIG. 7, trace 702 illustrates the call from the calling party of the equipment 116 to the called party of the equipment 118. The trace 702 comprises the application server component 104, the function server component 108, the storage server component 110, the networks 114 and 130, the termination repository data component 136, an exemplary call header 606, and an exemplary call header 718. The termination repository data component 136 comprises public user identities 714 and 715 and respective termination digit strings 724 and 750. The public user identity 714 comprises the called party number 610 (e.g. foo@email.com). The public user identity 715 comprises the called party number 716 (e.g. skip@trails.net). The termination digit string 724 comprises the digit string *3*. The termination digit string 750 comprises the digit string *7*. The exemplary call header 606 comprises the called-party-number field 614 and the calling-party-number field 616. The called-party-number field 614 comprises the called party number 610. The calling-party-number field 616 comprises the calling party number 608. The exemplary call header 718 comprises the called-party-number field 720 and the calling-party-number field 722. The called-party-number field 720 comprises the called party number 610. The calling-party-number field 722 comprises the calling party number 608 prepended with the termination digit string 724. Trace 702 comprises the STEPS 730, 732, 734, 736, 738, 740, and 742.

After performing the steps of FIG. 6, the call comprises the called party number 610 and the calling party number 608, as illustrated in the STEP 730. The network 130 routes the exemplary call header 606 to the network 114 and to the function server component 108, as shown in the STEP 732. The function server component 108 routes the call to the application server component 104 based on the filter criteria associated with the called party number 610 of the exemplary call header 606, as shown in the STEP 734. The application server component 104 employs the called party number 610 of the exemplary call header 606, in the STEP 736, to select the public user identity 714 and the termination digit string 724 *3* and to impose the one charge on the called party number 610. The application server component 104 prepends the termination digit string 724 to the calling party number 608 of the exemplary call header 606 and inserts the calling party number 608 prepended with the termination digit string 724 into the calling-party-number field 722 of the exemplary call header 718 as shown in the STEP 738. The application server component 104 inserts the called party number 610 into the called-party-number field 720 of the exemplary call header 718, in the STEP 740. The application server component 104 returns the call to the function server component 108 with the exemplary call header 718 in the STEP 742.

Figure 8:
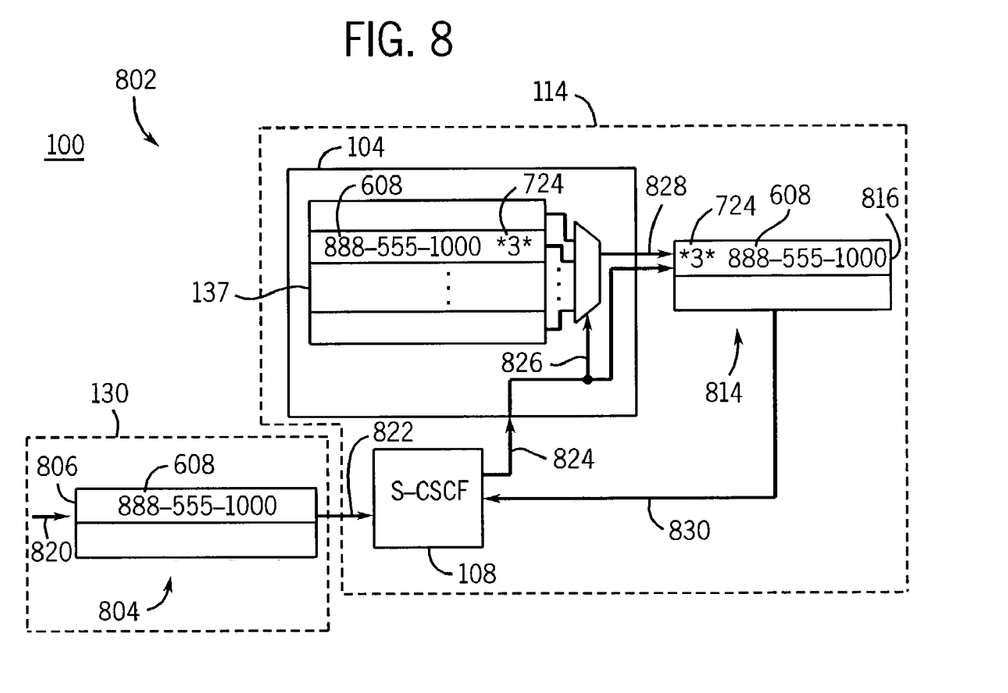
FIG. 8 is an exemplary, expanded functional flow of a callback call from the second equipment to the first equipment, focusing on the callback call between the second equipment and one application server component of the one or more application server components of the apparatus of FIG. 1.

Turning to FIG. 8, trace 802 illustrates the callback call. The trace 802 comprises the application server component 104, the function server component 108, the networks 114 and 130, an exemplary call header 804, and an exemplary call header 814. The application server component 104 comprises the callback component 137. The callback component 137 comprises the calling party number 608 and the digit string 724. The exemplary call header 804 comprises the called-party-number field 806 that comprises the called party number 608. The exemplary call header 814 comprises the called-party-number field 816 that comprises the digit string 724 and the called party number 608. Trace 802 comprises the STEPS 820, 822, 824, 826, 828, and 830.

After receiving the call from the party of the equipment 116 and performing the steps of FIGS. 6 and 7, the callback component 137 of the application server component 104 comprises the calling party number 608 of the call and the one termination digit string 724 of the call of FIG. 7. The party of the equipment 118 initiates the callback call to the party of the equipment 116, as shown in the STEP 820, by selecting the calling party number of the party of the equipment 118 previously received by the party of the equipment 116. The calling party number of the party of the equipment 118 previously received is inserted as the called party number 608 into the called-party-number field 806 of the exemplary call header 804. The network 130 routes the callback call to the network 114 and to the function server component 108 in the STEP 822. The function server component 108 routes the callback call to the application server component 104 based on the filter criteria associated with the party of the equipment 118 as in the STEP 824. The application server component 104 employs the called party number 608 of the exemplary call header 804 to obtain the termination digit string 724 previously received by the party of the equipment 118 from the callback component 137, as illustrated in the STEP 826. The application server component 104 prepends the called party number 608 with the digit string 724 previously received and inserts the called party number 608 and digit string 724 into the called-party-number field 816 of the exemplary call header 814, as shown in the STEP 828. The application server component 104 routes the callback call to the function server component 108 which then performs the STEPS of FIG. 6, where the application server component 102 employs the digit string 724 to obtain the calling party number 636 (e.g. mom@home.net) stored in the initiation repository data component 132.

Figure 9:
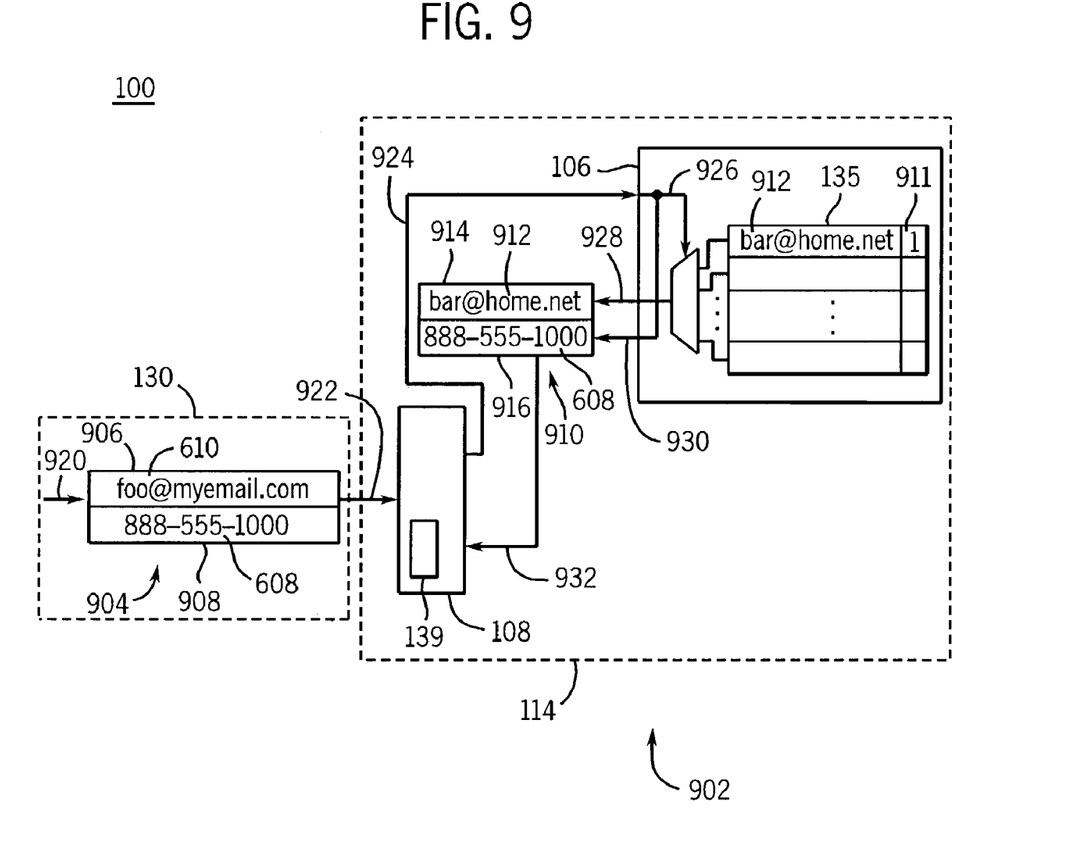
FIG. 9 is an exemplary, expanded functional flow of a forward-to call from the first equipment to one application server component of the one or more application server components, and from the one application server component to the second equipment of the apparatus of FIG. 1.

Turning to FIG. 9, trace 902 illustrates the forward-to call. The trace 902 comprises the application server component 106, the function server component 108, the networks 114 and 130, an exemplary call header 904, and an exemplary call header 910. The application server component 106 comprises the forward-to component 135 which comprises a forward-to number 912 and a forward-to enable 911. The function server component 108 comprises the multiple registration states 139 of the multiple public user identities for the called party of the equipment 118. The exemplary call header 904 comprises the called-party-number field 906 and the calling-party-number field 908. The called-party-number field 906 comprises the called party number 610. The calling-party-number field 908 comprises the calling party number 608. Trace 902 comprises the STEPS 920, 922, 924, 926, 928, 930, and 932.

The calling party of the equipment 116 initiates the call to the called party of the equipment 118, as illustrated in the STEPS of the FIG. 6, and is received in the STEP 920. The network 130 routes the call to the network 114 which routes the call to the function server component 108 in the STEP 922. The function server component 108 employs the called party number 610 to obtain one registration state of the registration states 139 of the one public user identity. The function server component 108 routes the call to the application server component 106 based on the one registration state of the called party number 610 in the STEP 924. The application server component 106 employs the called party number 610 in the STEP 926 to obtain the forward-to number 912 and to check the forward-to enable 911 associated with the called party number 610. The application server component 106 initiates the forward-to call in the STEP 928 by inserting the forward-to number 912 into the called-party-number field 914 of the exemplary call header 910. The application server component 106 inserts the calling party number 608 into the calling-party-number field 916 of the exemplary call header 910 in the STEP 930 and serve to impose the one charge on the called party number 608 (e.g. impose the one charge on foo@myemail.com). The application server component 106 returns the forward-to call to the function server component 108 in the STEP 932. The function server component 108 routes the call as in the STEPS of FIG. 7.

An illustrative description of exemplary operation of the apparatus 100 is now presented, for explanatory purposes.

The party of the equipment 116 enters the visiting network 106. The equipment 116 initiates the REGISTER message to the visiting network 106. The visiting network 130 serves to route the REGISTER message to the home network 114 of the party of the equipment 116. The home network 114 serves to route the REGISTER message to the function server component 108. The function server component 108 communicates with the storage server component 110 to download the relevant information of the profile of the party of the equipment 116. The party of the equipment 118 serves to register on the visiting network 106 analogous to the REGISTER message of the party of the equipment 116.

The function server component 108 serves to route the REGISTER message to the application server component 102, 104, and 106 based on the filter criteria of the profile of the party of the equipment 116. The application server component 102, 104, and 106 in turn communicate with the storage server component 110 to download the relevant information from the profile of the party of the equipment 116.

In another example, one of the public user identities of the party of the equipment 116 comprises the email address: foo@email.account. One of the public user identities of the party of the equipment 118 comprises the cellular phone number of 1-800-555-1000. The public user identity of the party of the equipment 116 corresponds to the digit string *3*. The public user identity of the party of the equipment 118 corresponds to the digit string *2*.

The equipment 116 initiates the call to the equipment 118. The party of the equipment 116 selects the calling party number on which the one charge is imposed for the call by prepending the initiation digit string, *3*, to the called party number of the equipment 118, 1-800-555-1000.

The network 130 serves to route the call to the network 114 of the party of the equipment 116. The function server component 108 serves to route the call to the application server component 102 based on the filter criteria of the profile of the party of the equipment 116. The filter criteria of the profile of the party of the equipment 116 indicates that where the called party number is prepended with the initiation digit string, the function server component 108 serves to route the initiation segment of the call to the application server component 102.

Upon receipt of the call, the application server component 102 serves to remove the initiation digit string from the called party number and employs the initiation digit string to obtain the calling party number, the email address foo@email.account. The application server component 102 inserts the calling party number in the P-Asserted-Identity header of the call. The application server component 102 serves to impose the one charge on the calling party number foo@email.account. The application server component 102 then returns the call to the function server component 108.

The function server component 108 serves to route the call to the application server component 104 based on the filter criteria of the profile of the party of the equipment 118. The filter criteria of the party of the equipment 118 indicates that for the call where the called party number matches one of the one public user identity of the one or more public user identities of the party of the equipment 118, the function server component 108 serves to route the call to the application server component 104.

Upon receipt of the call, the application server component 104 serves to prepend the calling party number in the P-Asserted-Identity header with the termination digit string associated with the one public user identity that matches the called party number of the call. The application server component 104 prepends the calling party number, foo@email.account, with the termination digit string, *2*, corresponding to the called party number of the call. The application server component 104 then returns the call to the function server component 108. The function server component 108 routes the call to the party of the equipment 118. The display on the calling party equipment 118 comprises *2*foo@email.account.

In another example, the party of the equipment 116 initiates the call to the party of the equipment 118 by dialing the called party number of the equipment 118, 1-800-555-1000. Upon receipt of the call, the application server component 102 serves to employ the called party number of the call to obtain the calling party number from the custom-initiation repository data component 134. The application server component 102: inserts the calling party number in the P-Asserted-Identity header of the call; imposes the one charge on the calling party number foo@email.account; and returns the call to the function server component 108.

In a further example, the party of the equipment 118 has two public user identities associated with the profile of the party. The public user identity corresponding to the digit string *1* comprises a calling party email address of bar@email.account. The public user identity corresponding to the digit string *2* in one example comprises the phone number 1-800-555-5000. The public user identity associated with the digit string *2* comprises the registered stated.

The party of the equipment 118 initiates a DEREGISTER message comprising the toggle string *72 which indicates that the public user identity associated with the digit string *2* is to be deregistered. The equipment 118 routes the call comprising the toggle string of *72 to the function server component 108. The function server component 108 routes the call comprising the toggle string *72 to the application server component 106 based on the filter criteria associated with the party of the equipment 118. The application server component 106 initiates the second DEREGISTER message to the function server component 108 that serves to deregister the public user identity associated with the digit string *2* of the party of the equipment 118 and initiates the REGISTER message for the public user identity associated with the digit string *1* of the party of the equipment 118 based on the toggle component 138. The function server component 108 forwards the DEREGISTER message and the REGISTER message to the application server components 102, 104 and 106, and notifies the storage server component 110 of the change in registration states for the public user identities associated with the party of the equipment 118. The application server components 102, 104, and 106 download the relative information from the profile of the party of the equipment 118 from the storage server component 110.

The apparatus 100 in one example employs one or more computer-readable signal-bearing media. One example of a computer-readable signal-bearing medium for the apparatus 100 comprises an instance of the recordable data storage medium 102 such as one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network. An exemplary component of the apparatus 100 employs and/or comprises a set and/or series of computer instructions written in or implemented with any of a number of programming languages, as will be appreciated by those skilled in the art.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
one or more application server components that serve to impose one or more charges for a call on a plurality of respective numbers associated with one or more parties of a plurality of parties to the call; and
a serving call session control function server that comprises multiple profiles for the one or more parties to the call, wherein the serving call session control function server comprises multiple public user identities for the one or more parties to the call;
wherein the multiple profiles comprise one profile for one party of the one or more parties, wherein the one profile comprises a plurality of public user identities of the multiple public user identities, wherein each public user identity of the plurality of public user identities comprises one or more numbers, wherein the one or more numbers comprise any of a phone number, email address, and digit string;
wherein the serving call session control function server maintains a registration state for each public user identity of the plurality of public user identities of the one profile;
wherein one application server component of the one or more application server components imposes one charge of the one or more charges on the one public user identity that comprises one number of the one or more numbers;
wherein upon receipt of the call, the serving call session control function server employs the one profile to route the call to one or more application server components of the one or more application server components;
wherein the call comprises a header of the call, wherein the header of the call comprises a called-party-number field and a calling-party-number field, wherein the header of the call comprises the one number, wherein the one number comprises any of a phone number, email address, and digit string within the called-party-number field or the calling-party-number field;

wherein the one application server component and the serving call session control function server communicate via session initiation protocol (SIP);

wherein the one application server component supports a P-Asserted-Identity header extension of the session initiation protocol;

wherein upon receipt of a DEREGISTER message, the serving call session control function server serves to change to a deregistered state the registration state that corresponds to the one public user identity.

2. The apparatus of 1, wherein the one party comprises a calling party to the call, wherein the one number comprises one digit string, wherein the called-party-number field comprises one called party number prepended with the one digit string, wherein the one application server component comprises or is coupled with a copy of the plurality of public user identities of the one profile; and wherein upon receipt of the call, the one application server component employs the one digit string prepended to the one called party number to relate the one digit string with the one public user identity of the plurality of public user identities and to impose the one charge on the one public user identity that comprises the one digit string.

3. The apparatus of claim 2, wherein the one application server component comprises an initiation repository data component that serves to store the copy of the plurality of public user identities; and wherein upon receipt of the call, the one application server component: removes the one digit string from the one called party number; employs the one digit string to obtain one calling party number, of the one public user identity, from the initiation repository data component; and inserts the one calling party number into the calling-party-number field of the header of the call;

wherein the calling-party-number field comprises a P-Asserted-Identity field.

4. The apparatus of claim 1, wherein the called-party-number field comprises the one number of the one public user identity, wherein the one party comprises a called party, wherein the one application server component comprises or is coupled with a copy of the plurality of public user identities of the one profile; and wherein upon receipt of the call, the one application server component serves to impose the one charge on the public user identity that comprises the one called party number of the called-party-number field of the header of the call.

5. The apparatus of claim 4, wherein the one application server component comprises a termination repository data component that serves to store the copy of the plurality of public user identities; and wherein upon receipt of the call, the one application server component employs the one number to obtain one digit string of the one public user identity from the termination repository data component and prepends the one digit string to a calling party number of the calling-party-number field of the header of the call.

6. The apparatus. of claim 1, wherein the called-party-number field comprises the one number of the one public user identity, wherein the one party comprises a calling party to the call, wherein the one application server component comprises or is coupled with a copy of the plurality of public user identities; and wherein upon receipt of the call, the one application server component employs the one number to relate the one number to one calling party number of the one or more numbers of the one public user identity and imposes the one charge on the one public user identity that is related to the one number.

7. The apparatus of claim 6, wherein the one application server component comprises or is coupled with a custom-initiation repository data component that serves to store a copy of the plurality of public user identities, wherein the calling party serves to employ the custom-initiation repository data component to relate the one number to the one calling party number; and wherein upon receipt of the call the one application server component employs the one number to obtain the one calling party number from the custom-initiation repository data component and inserts the one calling party number into the calling-party-number field of the header of the call;

wherein the calling-party-number field comprises a P-Asserted-Identity field.

8. The apparatus of claim 1, wherein upon receipt of the DEREGISTER message, the serving call session control function server employs one toggle string of the DEREGISTER message to relate the one toggle string to the one public user identity and change to the deregistered state the registration state of the one public user identity; and wherein the deregistration message comprises an invite message that comprises the one toggle string.

9. The apparatus of claim 1, wherein the serving call session control function server maintains the registration states for the plurality of public user identities;

wherein upon receipt of a deregistration message that comprises one toggle string, the serving call session control function server employs the one toggle string to: relate the one toggle string to the one public user identity; change from a registered state to a deregistered state the registration state of the one public user identity; and change registration states from respective deregistered states to respective registered states of all the public user identities of the plurality of public user identities except the one public user identity based on the toggle enable of the one profile of the one party; and wherein the one toggle string corresponds to the one public user identity.

10. The apparatus of claim 9, wherein the serving call session control function server employs the one toggle string to initiate one or more REGISTER messages to one or more of the one or more application server components, wherein the one or more REGISTER messages relate to the plurality of public user identities; and wherein the serving call session control function server serves to change one or more registration states of one or more public user identities of the plurality of public user identities and serves to initiate the one or more REGISTER messages for the one or more public user identities, respectively.

11. The apparatus of claim 1, wherein the call comprises a first call, wherein the one or more parties comprises a calling party to the call and a called party to the call, wherein the calling party initiates the first call to the called party, wherein the first call comprises the calling-party-number field, wherein the calling-party-number field comprises one calling party number, wherein the calling party number is prepended with one digit string;

wherein the first call comprises the called-party-number field, wherein the called-party-number field comprises one called party number;

wherein the one application server component comprises a callback component that serves to store the one calling party number and the one digit string of the call;

wherein upon receipt of a second call, the one application server component employs one second called party number to obtain the one digit string from the callback component and to prepend the one second called party number with the one digit string; and wherein the called party initiates the second call to the calling party, wherein the second call comprises a second header, wherein the second header comprises one second called-party-number field that comprises the one second called party number, wherein the one second called party number comprises the one calling party number of the first call, wherein the one second called party number omits the one digit string prepended to the one second called party number of the second call.

12. The apparatus of claim 1, wherein the call comprises a first call, wherein the one or more parties to the first call comprises a calling party and a called party, wherein the first call comprises a called party number associated with one public user identity of the called party, wherein the one public user identity comprises a deregistered state, wherein one application server component of the one or more application server components comprises multiple forward-to enables and respective multiple forward-to numbers associated with the called party;

wherein upon receipt of the first call destined for the one public user identity of the called party the one application server component employs one forward-to enable of the multiple forward-to enables associated with the called party number to initiate a second call to one forward-to number of the multiple forward-to numbers associated with the called party; and wherein the one application server component inserts the one forward-to number into a second called-party-number field of the second call.

13. The apparatus of claim 12, wherein upon receipt of the first call the one application server component employs the called party number of the first call to impose the one charge on the called party number of the first call.

14. A method, comprising the step of:

imposing one or more charges for a call on one public user identity associated with one party of a plurality of parties to the call through employment of a session initiation protocol (SIP) and a P-Asserted-Identity header extension of the session initiation protocol, wherein the call comprises a header of the call, wherein the header comprises a calling-party-number field and a called-party-number field;

storing one profile that comprises a plurality of public user identities for the one party, wherein the plurality of public user identities comprises the one public user identity.

maintaining a registration state for each public user identity of the one profile;

employing the one profile associated with the one party to route the call to one or more application server components;

receiving a DEREGISTER message from one party of the plurality of parties, wherein the DEREGISTER message comprises an invite message that comprises one toggle string, wherein the one toggle string refers to the one public user identity;

initiating one or more subsequent DEREGISTER messages to the one or more application server components by the serving call session control function. server upon receipt of the DEREGISTER message, wherein the DEREGISTER message serves to change to a deregistered state one or more registration status of respective one or more public user identities of the plurality of public user identities comprising a registered state;

employing a toggle enable, wherein the toggle enable is associated with the one party; and initiating one or more registration messages to the one or more application server components based on the toggle enable, wherein the serving call session control function server employs the toggle enable to provide that at least one public user identity of the plurality of public user identities associated with the one party comprises a registered state.

15. The method of claim 14, wherein the step of imposing the one or more charges for the call on the one public user identity associated with the one party comprises the steps of:

relating one digit string of the header of the call with the one public user identity of the plurality of public user identities.

16. The method of claim 14, wherein the step of imposing comprises the steps of:

employing one called party number of the called-party-number field to obtain one calling party number associated with the one public user identity; and inserting the one calling party number into the calling-party-number field of the header of the call, wherein the calling-party-number field comprises a P-Asserted-Identity field.

17. The method of claim 14, wherein the called-party-number field comprises one called party number, wherein the one called party number is prepended with one digit string associated with the one public user identity, wherein the step of imposing comprises the steps of:

removing the one digit string from the one called party number by one application server component of one or more application server components;

employing the one digit string to obtain one calling party number associated with the one public user identity; and inserting the one calling party number into the calling-party-number field of the header of the call, wherein the calling-party-number field comprises a P-Asserted-Identity field.

18. The method of 14, wherein the called-party-number field comprises one called party number, wherein the step of imposing comprises the step of:

imposing one charge of the one or more charges on the one public user identity that comprises the called party number of the called-party-number field of the header of the call.

19. The method of claim 18, wherein the calling-party-number field comprises one calling party number, the method further comprising the step of:

prepending one digit string associated with the one public user identity to the one calling party number of the calling-party-number field of the header of the call.

20. The method of claim 14, wherein the call comprises a first call, wherein the one or more parties comprises a first party and a second party, wherein the first party initiates the first call to the second party, wherein the first call comprises one calling party number, wherein the one calling party number is prepended with one digit string, wherein the first call comprises one called party number, the method further comprising the step of:

storing the one digit string of the first call and the one calling party number of the first call in a callback component of one application server component of the one or more application sewer components.

21. The method of claim 20, wherein the call comprises a callback call, wherein the second party initiates the callback call to the first party, wherein the callback call comprises a calling-party-number field, wherein the callback call comprises a called-party-number field, wherein the called-party-number field of the callback call comprises one second called party number, wherein the one second called party number comprises the one calling party number of the first call, further comprising the steps of:
- relating the one second called party number of the callback call to the one calling party number of the first call stored in the callback component; and
- prepending the one second called party number of the called-party-number field of the callback call with the one digit string of the first call associated with the one calling parry number of the first call.

22. The method of claim 14, wherein a DEREGISTER message comprises a toggle string, wherein one application server component of one or more application server components comprises a toggle component, the method further comprising the steps of:
- forwarding the DEREGISTER message from a serving call session control function server to the one application server component;
- associating the toggle string with the one public user identity associated with the one party;
- initiating one or more DEREGISTER messages to the serving call session control function server by the one application server component based on the toggle siring of the DEREGISTER message for the one public user identity associated with the toggle string; and
- initiating one or more REGISTER messages to the serving call session control function server based upon the toggle component, wherein the toggle component employs a toggle enable associated with the one party to ensure that at least one public user identity of the plurality of public user identities associated with the one party comprises a registered state.

23. The apparatus of claim 1, wherein the plurality of respective numbers comprise a plurality of either E.164 numbers or Universal Resource Identifiers.

* * * * *